(12) United States Patent
Dhayni (10) Patent No.: US 9,729,209 B2
(45) Date of Patent: Aug. 8, 2017

(54) NEAR FIELD COMMUNICATION METHOD OF DETECTION OF A TAG PRESENCE BY A TAG READER

(71) Applicant: Optis Circuit Technology, LLC, Plano, TX (US)

(72) Inventor: Achraf Dhayni, Vallauris (FR)

(73) Assignee: Optis Circuit Technology, LLC, Plano, TX (US)

( * ) Notice: Subject to any disclaimer, the term of this patent is extended or adjusted under 35 U.S.C. 154(b) by 0 days.

(21) Appl. No.: 14/438,733

(22) PCT Filed: Nov. 20, 2013

(86) PCT No.: PCT/EP2013/074283
§ 371 (c)(1),
(2) Date: Apr. 27, 2015

(87) PCT Pub. No.: WO2014/082906
PCT Pub. Date: Jun. 5, 2014

(65) Prior Publication Data
US 2015/0303997 A1 Oct. 22, 2015

Related U.S. Application Data

(60) Provisional application No. 61/746,350, filed on Dec. 27, 2012.

(30) Foreign Application Priority Data

Nov. 27, 2012 (EP) .................................... 12306461

(51) Int. Cl.
*H04Q 5/22* (2006.01)
*H04B 5/00* (2006.01)
*G06K 7/10* (2006.01)

(52) U.S. Cl.
CPC ....... *H04B 5/0062* (2013.01); *G06K 7/10128* (2013.01); *G06K 7/10237* (2013.01); *G06K 7/10297* (2013.01)

(58) Field of Classification Search
CPC . G06K 7/0008; G06K 19/0723; H04B 5/0062
(Continued)

(56) References Cited

U.S. PATENT DOCUMENTS 4,000,489 A * 12/1976 Bench ...................... H03D 3/00
273/454
5,371,760 A * 12/1994 Allen ................... H04L 25/0212
375/142

(Continued)

FOREIGN PATENT DOCUMENTS

EP    1 394 720 A2    3/2004
EP    1 533 624 A1    5/2005
(Continued)

OTHER PUBLICATIONS

International Search Report issued in corresponding International application No. PCT/EP2013/074283, date of mailing Feb. 17, 2014.

*Primary Examiner* — Vernal Brown
(74) *Attorney, Agent, or Firm* — Grable Martin Fulton PLLC; Spencer C. Patterson (57) ABSTRACT

A Near Field Communication method performed by a tag reader detects whether a tag is present. The method includes stimulating the tag reader's transmitter to generate an impulse response, evaluating the impulse response generated by the transmitter to obtain an evaluated impulse response, and assessing whether a tag is present based on the evaluated impulse response.

22 Claims, 6 Drawing Sheets

(58) Field of Classification Search
USPC .......................................................... 340/10.1
See application file for complete search history.

(56) References Cited

U.S. PATENT DOCUMENTS

| | | | | |
|---|---|---|---|---|
| 6,262,662 | B1 * | 7/2001 | Back | G06K 7/0008 340/4.1 |
| 6,476,708 | B1 * | 11/2002 | Johnson | G06K 7/0008 340/10.34 |
| 7,180,403 | B2 * | 2/2007 | Quan | G06K 7/0008 340/10.3 |
| 7,411,506 | B2 * | 8/2008 | Volpi | G01S 13/66 340/505 |
| 2008/0204322 | A1 * | 8/2008 | Oswald | G01S 5/04 342/465 |
| 2011/0251807 | A1 * | 10/2011 | Rada | G01D 4/00 702/61 |
| 2012/0081131 | A1 * | 4/2012 | Hausmann | G06K 7/10128 324/654 |

FOREIGN PATENT DOCUMENTS

| | | |
|---|---|---|
| EP | 1 840 789 A1 | 10/2007 |
| EP | 2 735 994 B1 | 2/2015 |

* cited by examiner

NEAR FIELD COMMUNICATION METHOD OF DETECTION OF A TAG PRESENCE BY A TAG READER

TECHNICAL FIELD

The invention relates to near field communication methods of detection of a tag presence by a tag reader.

BACKGROUND

According to a first prior art, a Near Field Communication (NFC) reader periodically checks for available nearby tags by sequentially polling for all compatible standards and waits for tag response. In a mobile device, this method will significantly drain battery of the NFC reader as, for each standard, a possible tag must be given time to respond, which means notably at least 5 ms for field powering, during which the reader must send its full power output for enabling the tag to load modulate. This results in a high duty cycle for the polling time with full transmission power causing high average power consumption in the NFC reader, for detecting possible present tag.

According to a second prior art, it is known a method called Low Power Tag Detection (LPTD) which is used by the Near Field Communication reader to detect the presence of a nearby tag. The method is based on a chirp stimulus that is used to measure, on-chip, the resonance frequency and the quality factor at the output of the reader transmitter. According to the respective values of the measured resonance frequency and quality factor, the reader detects if a nearby tag is present or not in its vicinity. This second prior art detects tag presence or absence by observing the detuning of the antenna of the reader transmitter, that a possibly present tag represents, to the reader front-end.

Figure 1A:
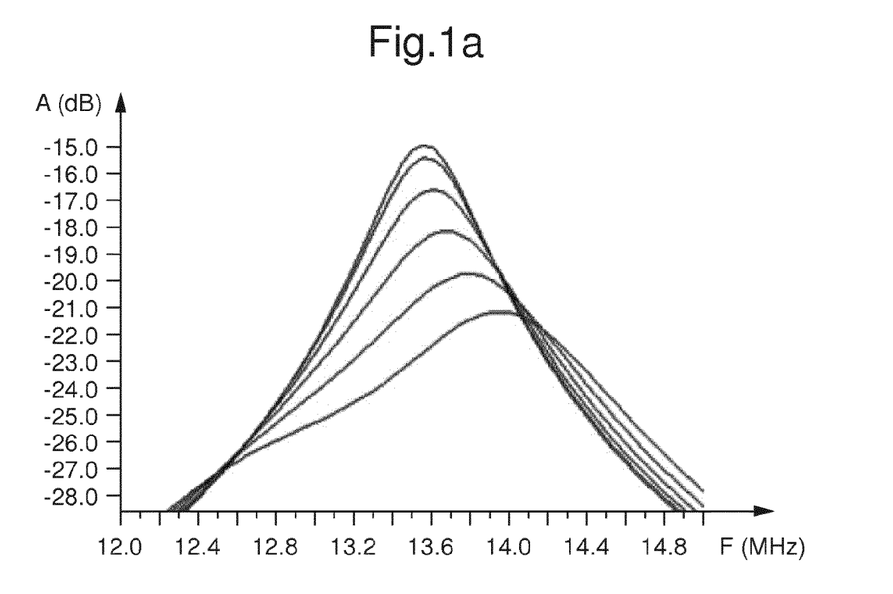
FIG. 1*a* shows an example of detuning of an antenna of a reader due to a nearby tag, when reader and nearby tag both resonate at the same frequency.
Figure 1B:
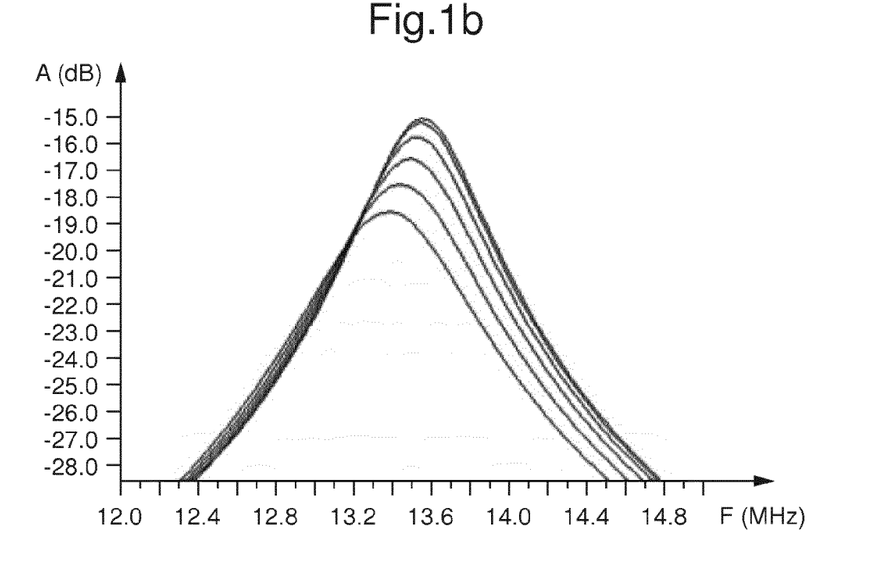
FIG. 1*b* shows an example of detuning of an antenna of a reader due to a nearby tag, when reader and nearby tag each resonate at a different frequency.

However, this Low Power Tag Detection method suffers from fault tag detection, as will be illustrated notably by FIGS. 1a and 1b. An antenna coupling between reader and tag is simulated. The reader antenna quality factor is reduced with series resistors, and matched to the reader transmitter pins via a three-capacitor matching circuit. The reader transmitter represents a low impedance (voltage) drive to the reader transmitter pins, while also replicating the reader transmitter current waveform into the reader receiver for detecting load modulation and nearby tag presence if any.

According to this Low Power Tag Detection method, every couple of hundreds of milliseconds, the reader seeks for a nearby tag. To seek for a nearby tag, the reader transmitter sends out a chirp signal. In the case of the NFC IP of CG2910, the chirp signal frequency is swept from 12 MHz to 15 MHz. In the absence of a nearby tag, due to the reader load across the reader transmitter output terminals, the chirp signal resonates at the resonance frequency of the reader (for example 13.56 MHz for the NFC IP of CG2910). However, in the presence of a nearby tag, the load across the reader transmitter output terminals is impacted by the presence of the tag, which implies that the chirp signal resonates at a frequency different from the reader resonance frequency (for example 13.56 MHz for the NFC IP of CG2910).

Since the reader receiver is used to copy the reader transmitter output signal (chirp), this copy is then analyzed to calculate the value of the resonance frequency of the chirp signal. Once a different resonance frequency is detected, meaning a nearby tag is detected, the reader starts a new NFC communication with this newly detected nearby tag. This is how this Low Power Tag Detection method works.

FIG. 1a shows an example of detuning of an antenna of a reader due to a nearby tag, when reader and nearby tag both resonate at the same frequency. This common resonance frequency is 13.56 MHz. The amplitude A of the reader transmitter current is expressed in decibels dB and plotted as a function of the frequency expressed in Mega Hertz MHz. The detuning of the resonance frequency of the reader, from its original value, is all the more important that the nearby tag becomes closer to the reader and that the coupling factor k increases, what is shown through the multiple curves plotted on FIG. 1a. The corresponding respective values of the coupling factor k are 0-2-4-6-8-10%, the higher peak curves corresponding to the lower coupling factor k values. In this example, the reader quality factor value is 25, the tag quality factor value is 35, and the reader matching circuit comprising two series capacitors of same capacitive value 2*C1r, a capacitor in parallel of capacitive value C2r, there is the following relation: C1r/(C1r+C2r)=0.9, the current $i_{tx}$ circulating in the reader matching circuit and in the reader antenna has a value of 100 mA rms.

FIG. 1b shows an example of detuning of an antenna of a reader due to a nearby tag, when reader and nearby tag each resonate at a different frequency. FIG. 1b is quite similar to FIG. 1a, except that the resonance frequency of the reader is 13.56 MHz, whereas the resonance frequency of the tag is 16 MHz. The amplitude A of the reader transmitter current is expressed in decibels dB and plotted as a function of the frequency expressed in Mega Hertz MHz. The detuning of the resonance frequency of the reader, from its original value, is all the more important that the nearby tag becomes closer to the reader and that the coupling factor k increases, what is shown through the multiple curves plotted on FIG. 1b. The corresponding respective values of the coupling factor k are 0-2-4-6-8-10%, the higher peak curves corresponding to the lower coupling factor k values. In this example, the reader quality factor value is 25, the tag quality factor value is 35.

The Low Power Tag Detection method according to second prior art presents weakness and ineffectiveness in the presence of a nearby ground plane or any metallic or magnetic or lossy body. This disadvantage of Low Power Tag Detection method according to second prior art, is that a nearby tag is not the only possible cause for detuning. Through measurements on the same reader as the one used for FIGS. 1a and 1b, it was possible to prove that nearby metallic, magnetic, or lossy objects will also detune the reader transmitter circuit response, as can be seen on FIGS. 2 and 3. This disadvantage is a major one, since for example in NFC mobile applications, there will be a metallic ground plane on the host platform PCB ("printed circuit board"), and the battery will have an effect similar to a metallic plate too.

Figure 2:
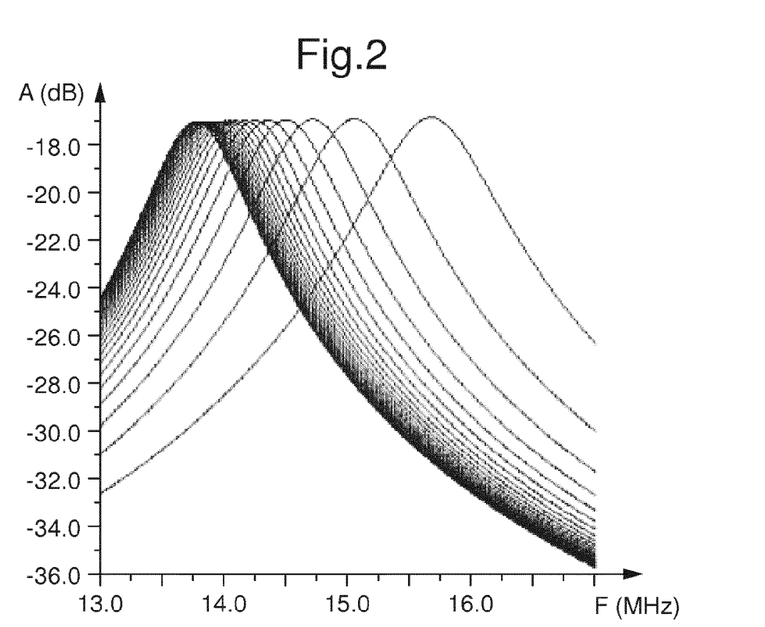
FIG. 2 shows an example of detuning of an antenna of a reader due to a nearby metal plane.

FIG. 2 shows an example of detuning of an antenna of a reader due to a nearby metal plane. The amplitude A of the reader transmitter current is expressed in decibels dB and plotted as a function of the frequency expressed in Mega Hertz MHz. When an NFC antenna coil is close to a metallic object, the generated magnetic field and the antenna inductance and quality factor will change due to induced circulation currents. The reader transmitter current is respectively measured with a parallel metallic plane at 3, 5, 10, 15, 20 and 25 mm distance. FIG. 2 shows how the front-end of the reader progressively detunes because of a metallic surface coming closer to the reader. The metallic object has a severe impact on the resonance frequency of the reader, and this will most probably trigger a false tag detection during processing of the Low Power Tag detection method according to the second prior art. Its lack of detection reliability in case of metallic surface in the vicinity of the reader which mistakes it for a tag, is a first major disadvantage of this second prior art.

Figure 3:
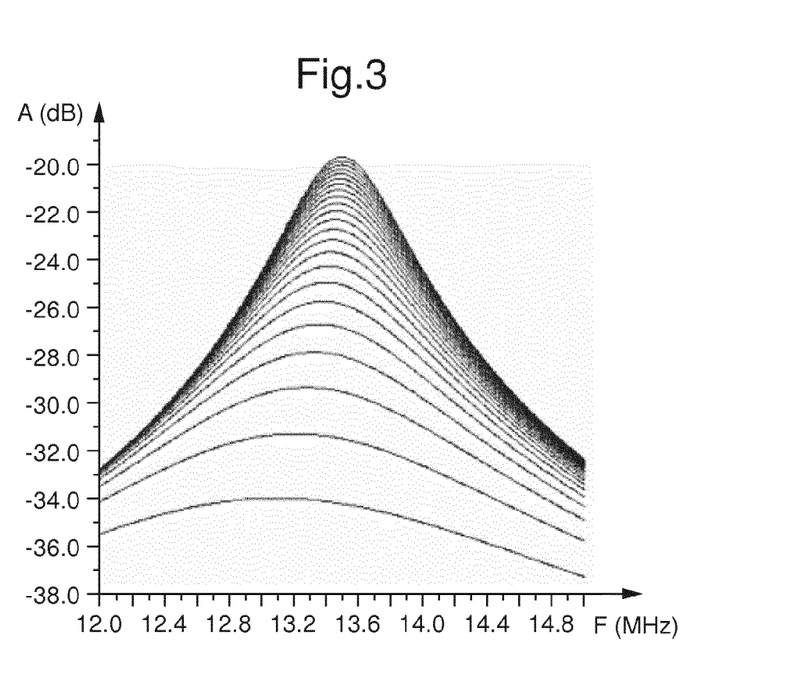
FIG. 3 shows an example of detuning of an antenna of a reader due to a nearby lossy plane.

FIG. 3 shows an example of detuning of an antenna of a reader due to a nearby lossy plane. The amplitude A of the reader transmitter current is expressed in decibels dB and plotted as a function of the frequency expressed in Mega Hertz MHz. The nearby lossy plane comes closer to the reader in the same conditions as the metallic surface in FIG. 2. FIG. 3 shows how the front-end of the reader progressively detunes because of a lossy plane coming closer to the reader. The lossy object has a severe amplitude impact on the peak of the reader transmitter current, and this will most probably trigger a false tag detection during processing of the Low Power Tag detection method according to the second prior art. The lack of detection reliability, of the second prior art, in case of lossy object in the vicinity of the reader which mistakes it for a tag, is a second major disadvantage.

SUMMARY

An object of embodiments of the present invention is to alleviate at least partly the above mentioned drawbacks.

More particularly, embodiments of the invention aim to provide an advanced Low Power Tag Detection method which is more reliable than the Low Power Tag Detection method according to the second prior art, especially in case of presence of a metallic surface and or a lossy object in the vicinity of the reader supposed to detect the presence of a tag in its vicinity. This advanced Low Power Tag Detection method evaluates one or more parameters which are different from the parameters evaluated by the Low Power Tag Detection method according to the second prior art. Impulse response (IR) of the reader transmitter is evaluated instead of resonance frequency and quality factor of the reader transmitter. The impulse response, which is the representation of the transfer function in the time domain, contains not only the resonance frequency and quality factor information in the time domain, but it also contains practically all information about the different aspects that impact the signal at the reader transmitter output. That is why, by measuring the impulse response, the reader, according to embodiments of the invention, can detect whether a nearby tag is present or not in the vicinity of the reader. Therefore, much better robustness and very low fault tag detection are possible.

Preferably the signal used to stimulate the reader transmitter so as to generate an impulse response of the reader transmitter is different too. In an embodiment, a preferred stimulating signal is a maximal length sequence (MLS), stimulus that is much easier to generate on-chip in the reader than the chirp signal of Low Power Tag Detection method of the second prior art. Using this maximal length sequence as stimulus allows for a simple and cheap way to get at the much better robustness and the very low fault tag detection which are made possible by measuring the impulse response of the reader transmitter. By using the maximal length sequence as stimulus for the reader transmitter, a fully digital design with negligible silicon overhead is made possible, rendering the global system even more cheap and reliable.

This object and other objects may be achieved with a Near Field Communication method of detection of a tag (6) presence by a tag reader (5), comprising: stimulating (S2) the transmitter (1, 2) of the reader (5) with a signal representative of a pseudo-random binary sequence so as to generate an output signal based on the impulse response of said transmitter (1, 2), evaluating (S3) the generated output signal in order to extract the impulse response of said transmitter (1, 2), assessing (S4), from the extracted impulse response of said transmitter (1, 2), the presence (S5) or the absence (S6) of a tag (6).

Another object may be achieved with a Near Field Communication method of detection of a tag presence by a tag reader, comprising: stimulating the transmitter of the reader so as to generate an impulse response of said transmitter, evaluating the generated impulse response of said transmitter, assessing, from the evaluated impulse response of said transmitter, the presence or the absence of a tag.

This object and other objects may also be achieved with a Near Field Communication tag reader, comprising: an emitter adapted to send a stimulating signal representative of a pseudo-random binary sequence to an input of the transmitter of the reader so that said transmitter generates an output signal based on the impulse response of said transmitter, an evaluator adapted to extract the impulse response of said transmitter from said generated output signal, an assessor adapted to assess, from the extracted impulse response of said transmitter, the presence or the absence of a tag.

Another object may be achieved with a Near Field Communication tag reader, comprising: an emitter adapted to send a stimulating signal to an input of the transmitter of the reader so as to generate an impulse response of said transmitter, an evaluator adapted to evaluate the generated impulse response of said transmitter, an assessor adapted to assess, from the evaluated impulse response of said transmitter, the presence or the absence of a tag.

Preferred embodiments comprise one or more of the following features:

said assessing comprises: comparing said evaluated impulse response of said transmitter to a predetermined envelope, deducing, either presence of a tag if said evaluated impulse response of said transmitter is completely within said predetermined envelope or absence of a tag if said evaluated impulse response of said transmitter is at least partly outside said predetermined envelope.

said predetermined envelope extends between a predetermined minimal impulse response and a predetermined maximal impulse response, both predetermined impulse responses being such that any impulse response due to any tag of a predetermined set of tags all able to communicate with said reader will be simultaneously above said predetermined minimal impulse response and below said predetermined maximal impulse response.

said evaluated impulse response is digital, absence of a tag is deduced if at least one sample of said digital evaluated impulse response of said transmitter is outside said predetermined envelope.

said evaluating comprises digitally evaluating said generated impulse response.

said evaluating comprises cross-correlating a signal representative of a signal delivered at an output of said transmitter with a signal representative of a signal which has been sent to an input of said transmitter to generate said impulse response.

said stimulating comprises sending, to an input of said transmitter, a signal representative of a pseudo-random binary sequence.

said pseudo-random binary sequence is a maximal length sequence preferably generated by a linear feedback shift register.

said maximal length sequence parameters are chosen such that said reader emits a periodic polling signal for tag detection which emission duration lasts between 1% and 10% of total polling time, preferably between 5% and 10% of total polling time.

the order of said maximal length sequence ranges from 13 to 16.

the clock frequency of said maximal length sequence ranges from 1 Mhz to 1.5 Mhz.

said stimulating comprises sending, to an input of said transmitter, a stimulating signal such as the autocorrelation of said stimulating signal is close enough to a Dirac impulse so that a convolution of a signal representative of a signal delivered at an output of said transmitter with a signal representative of said stimulating signal gives substantially said generated impulse response.

said stimulating, said evaluating and said assessing are all performed on chip of said reader.

a computer program product comprising a computer readable medium, having thereon a computer program comprising program instructions, the computer program being loadable into a data-processing unit and adapted to cause execution of the method according to any embodiment when the computer program is run by the data-processing unit. Preferably, after assessment, from the evaluated impulse response of said transmitter, of the presence of a tag, the tag reader starts communicating with the detected tag, advantageously by starting a communication session with this detected tag.

Preferably, after assessment, from the evaluated impulse response of said transmitter, of the absence of a tag, the tag reader does not start any communication session but continues on polling for tag detection.

Preferably, the tag reader comprises a transmitter and a receiver. Preferably, the tag reader also comprises, successively connected, current mirrors at the outputs of this transmitter, an envelope detector to derive baseband signal, an analog to digital converter, a cross-correlating device which other input is connected to a Linear Feedback Shift Register.

Preferably, the tag reader uses an analog digital converter to evaluate said generated impulse response. Advantageously, this analog digital converter is part of the receiver of said reader and is used during signal reception by this receiver of said reader.

Further features and advantages of the invention will appear from the following description of embodiments of the invention, given as non-limiting examples, with reference to the accompanying drawings listed hereunder.

DETAILED DESCRIPTION OF THE INVENTION

Figure 4:
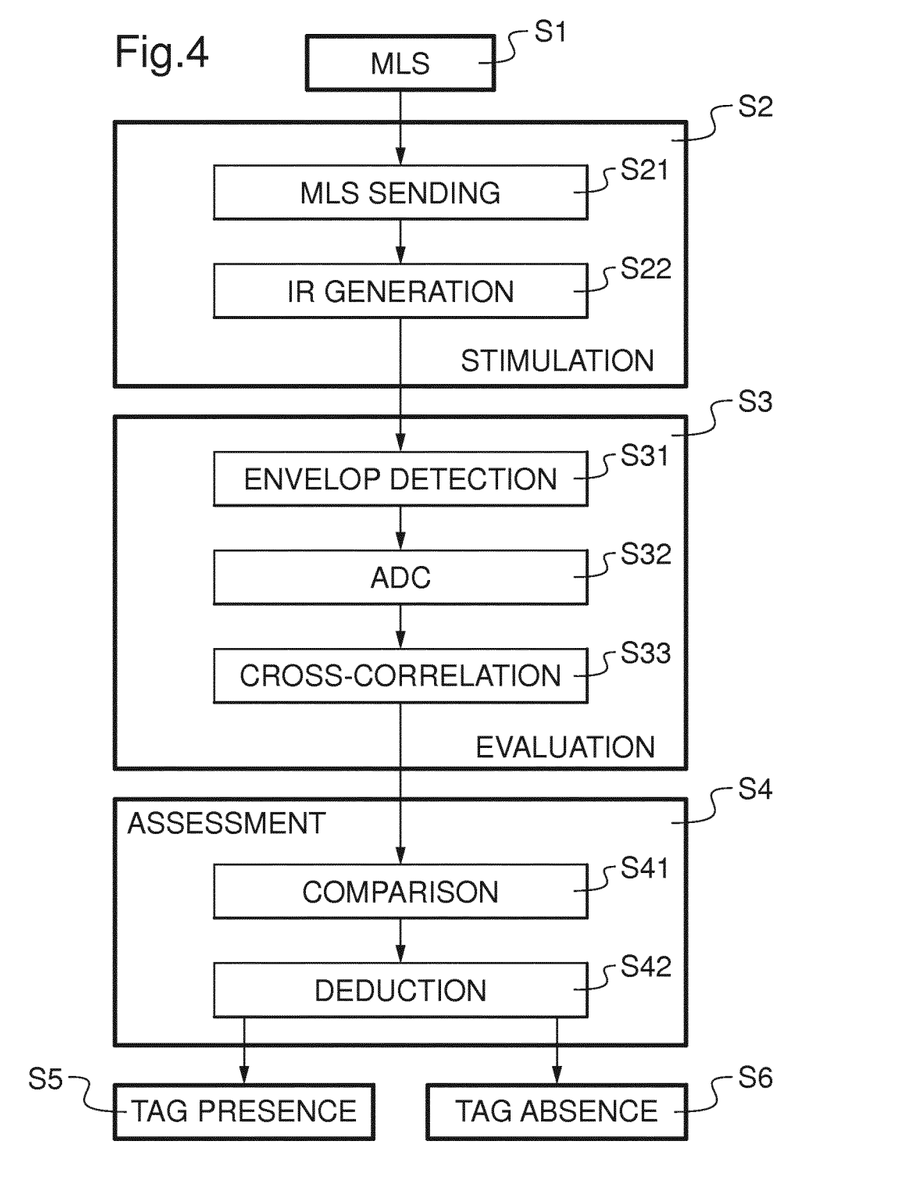
FIG. 4 shows an example of steps of a method of detection of a tag presence by a tag reader according to an embodiment of the invention.

FIG. 4 shows an example of steps of a method of detection of a tag presence by a tag reader according to an embodiment of the invention. In a step S1, a maximal length sequence MLS is generated on chip in the reader. In a group S2 of steps S21 and S22, this maximal length sequence MLS will be used to stimulate the reader transmitter so that the reader transmitter generates an impulse response. Generating on chip a digitized signal such as this maximal length sequence MLS is much more practical than would be an analog generation of sine waves. The generated impulse response depends on the presence or the absence of a tag in the vicinity of the reader. In a group S3 of steps S31, S32 and S33, the generated impulse response will be evaluated by the reader. In a group S4 of steps S41 and S42, the evaluated impulse response will be assessed by the reader in order either to give as result S5 that a tag is present in the vicinity of the reader, or to give as result S6 that there is no tag present in the vicinity of the reader. The groups S2, S3 and S4 of steps are performed successively.

Stimulation group S2 successively comprises step S21 and step S22. In step S21, the maximal length sequence is sent to stimulate the reader transmitter which emits a signal which impacts on a tag if there is one in the vicinity of the reader, which tag in turn load modulates the reader transmitter. Because of the coupling factor between the reader and the tag, the impulse response generated by the reader transmitter in step S22 is changed compared to the impulse response the reader transmitter would have generated in the absence of such a tag.

Evaluation group S3 successively comprises step S31, step S32 and step S33. In step S31, the generated impulse response is processed so that the envelope of the generated impulse response can be detected by separating the base band signal from the carrier frequency. In step S32, an analog digital conversion of the detected envelope is performed so that a digitized envelope can be obtained. In step S33, a cross-correlation between on the one hand this digitized envelope and on the other hand the maximal length sequence MLS which has been generated on chip in the reader in former step S1. This cross-correlation is performed between two base band signals.

Assessment group S4 successively comprises step 41 and step 42. In step S41, the previous result of the cross-correlation step S33 is compared to a predetermined envelope, in order to see whether this result is either fully within the predetermined envelope or at least partly outside the predetermined envelope. In step 42, from the result of the comparison, a deduction is performed to know whether there is a tag presence or is a tag absence. If the result of the comparison of step 41 is that the result of the cross-correlation step S33 is fully within the predetermined envelope, then the result of the deduction step S42 is an indication of a tag presence in step S5. On the contrary, if the result of the comparison of step 41 is that the result of the cross-correlation step S33 is at least partly outside the predetermined envelope, then the result of the deduction step S42 is an indication of a tag absence in step S6.

Figure 5:
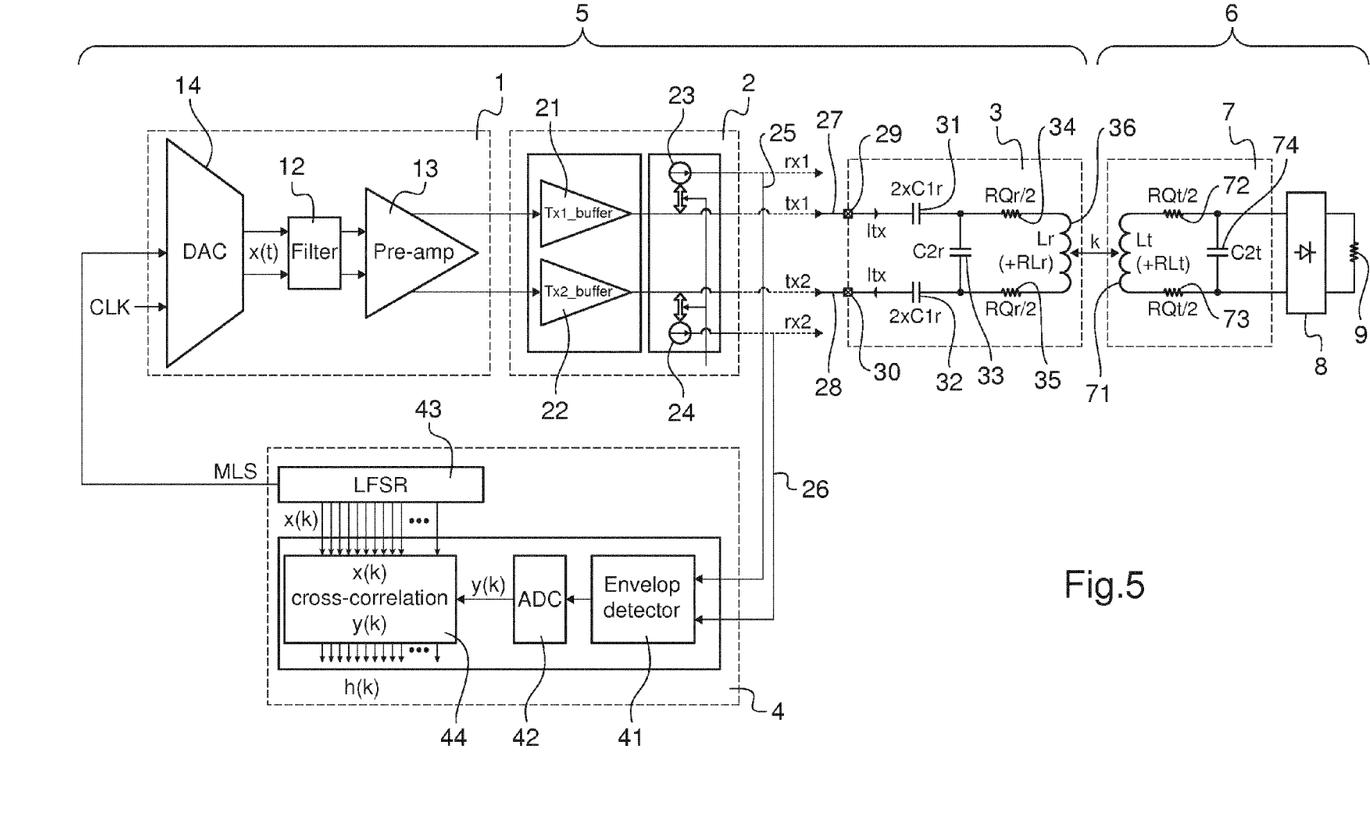
FIG. 5 shows an example of circuits of a tag reader and of a tag according to an embodiment of the invention.

FIG. 5 shows an example of circuits of a tag reader and of a tag according to an embodiment of the invention. There is a coupling, more particularly an antenna coupling between a reader 5 and a tag 6. The tag 6 successively comprises, from upside to downside with respect to signal transmission, a tag matching circuit 7, a tag rectifier 8 and a tag load 9. The tag matching circuit 7 successively comprises, from upside to downside with respect to signal transmission, a tag antenna 71 which is essentially an inductance, two series resistors 72 and 73 of same resistive value, one on each side of the tag antenna 71, a capacitor 74 in parallel.

The reader 5 successively comprises, from upside to downside with respect to signal transmission, a reader pretreatment circuit 1, a reader transmitter circuit 2, a reader matching circuit 3, one circuit being electrically connected to the next one. The reader 5 also comprises an additional reader evaluation circuit 4 which has an input fed by the output of the reader transmitter circuit 2, and which has one of its outputs feeding the input of the reader pretreatment circuit 1.

The reader pretreatment circuit 1, successively comprises, from upside to downside with respect to signal transmission, a digital analog converter 11, a filter 12, a pre-amplifier 13. A clock signal is generated and sent on one input of the digital analog converter 11, whereas a maximal length sequence MLS, generated in the reader evaluation circuit 4, is sent on the other input of the digital analog converter 11. Both outputs of digital analog converter 11 are connected to both inputs of filter 12. Both outputs of filter 12 are connected to both inputs of pre-amplifier 13. Filter 12 is a low pass filter with for example a cutoff frequency at 27 MHz.

The reader transmitter circuit 2, successively comprises, from upside to downside with respect to signal transmission, two transmitter buffers 21 and 22, two transmitter outputs 27 and 28, respectively linked to two connections 29 and 30. Thanks to two current mirrors 23 and 24, the two transmitter outputs 27 and 28 are replicated, on the one hand towards the reader receiver inputs rx1 and rx2, the reader receiver being not shown on FIG. 5 for sake of simplicity, and on the other hand towards the reader evaluation circuit 4 inputs 25 and 26. The two current mirrors 23 and 24 fulfill a double function which is to simultaneously replicate the signal towards the reader receiver and towards the additional reader evaluation circuit 4. The reader transmitter comprises the reader pretreatment circuit 1 and the reader transmitter circuit 2.

The reader matching circuit 3, successively comprises, from upside to downside with respect to signal transmission, two connections 29 and 30, two series capacitors of same capacitive value 31 and 32, a capacitor 33 in parallel, two series resistors 34 and 35 of same resistive value, one on each side of the capacitor 33, a reader antenna 36. The reader antenna 36 is inductively coupled to the tag antenna 71 by a coupling factor k. The reader antenna 36 is de-Q'ed, which means its quality factor Q is reduced, with series resistors 34 and 35 each having a resistive value of RQr/2, and matched to the transmitter connections 29 and 30 via a three-capacitor 31 to 33 matching circuit, respectively having a capacitive value of 2Clr and C2r. The reader transmitter represents a low-impedance drive, which is a voltage drive, to the transmitter connections 29 and 30, while also replicating the reader transmitter current waveform into the reader receiver for detecting load modulation, as well as in the additional reader evaluation circuit 4 for detecting nearby tag presence via impulse response evaluation.

The additional reader evaluation circuit 4, successively comprises, from upside to downside with respect to signal transmission, the reader evaluation circuit 4 inputs 25 and 26, the envelope detector 41, the analogue digital converter 42, the cross-correlation device 44. This analogue digital converter 42 can be shared with the reader receiver which also requires such an analogue digital converter. The linear feedback shift register 43 also feeds the cross-correlation device 44. At a first input of the cross-correlation device 44, there is a digitized signal y(k), which is representative of the impulse response generated by the reader transmitter, and at a second input of the cross-correlation device 44, there is a digitized signal x(k), which is the maximum length signal MLS, so that, at the output of the cross-correlation device 44, there is a digitized signal h(k), which is the impulse response of the reader transmitter, which has been extracted from the digitized signal y(k). The linear feedback shift register 43 also feeds the reader pretreatment circuit 1 with the maximum length signal MLS it generates.

Indeed, to measure the impulse response, a certain stimulus x(k), with k being the discrete time domain, is applied at the unloaded output of the reader transmitter. However, the reader transmitter is always loaded. Due to the reader transmitter output load, x(k) gets convoluted by the impulse response h(k) of the output load. Due to this convolution, a different signal y(t) is output by the reader transmitter such that y(k)=x(k)*h(k), where h(k) is the impulse response of the reader transmitter and where * is the convolution operation. Then, the impulse response can be obtained according to the cross-correlation method, because the input/output cross-correlation $\phi_{xy}(k)$ of x(k) and y(k) is the convolution of the output y(k) with the time reverse of the input x(k). This is derived as follows:

$$\begin{aligned}\phi_{xy}(k) &= y(k)*x(-k) \\ &= h(k)*(x(k)*x(-k)) \\ &= h(k)*\phi_{xx}(k) \\ &\cong h(k) \\ &\text{if } \phi_{xx}(k) \cong \delta(k)\end{aligned} \qquad \text{Equation 1}$$

The condition $\phi_{xx}(k) \cong \delta(k)$ is satisfied when x(k) is a white noise or a long maximal length sequence. Equation 1 shows how the input/output cross-correlation $\phi_{xy}(k)$ is derived to be equal to the impulse response h(k) when the stimulus is a white noise or a maximal length sequence.

The reader represented in FIG. 5 shows an implementation of a new advanced Low Power Tag Detection method using impulse response and maximal length sequence as stimulus to generate this impulse response. During performance of this method, the linear feedback shift register 43 injects a maximal length sequence MLS at the transmitting data input of the digital analog converter 11. At the outputs of the reader transmitter 27 and 28, the differential signal is the analog version of the injected maximal length sequence MLS after being amplified, up-converted to the resonance frequency of the reader which is 13.56 MHz, and then convoluted with the impulse response h(t) available at the connections 29 and 30 and being created by the output load of the reader transmitter. According to Equation 1 and according to the auto-correlation property $\phi_{xx}(k) \cong \delta(k)$ of the maximal length sequence MLS, h(k), a sampled version of h(t), can be calculated by cross-correlating x(k) and y(k). Indeed, as explained before, the result of this cross-correlation gives the impulse response h(k) which was searched for.

Figure 6:
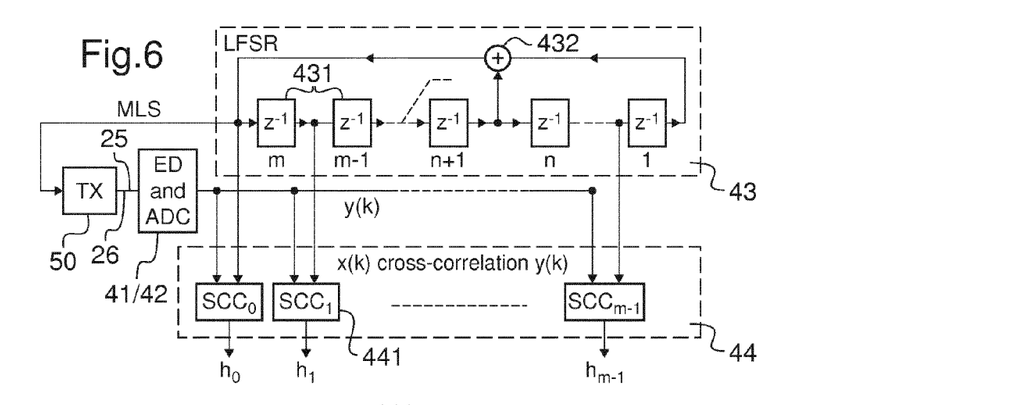
FIG. 6 shows an example of a detailed part of circuits of a tag reader as shown in FIG. 5.

FIG. 6 shows an example of a detailed part of circuits of a tag reader as shown in FIG. 5. The reader transmitter 50 comprises both the reader pretreatment circuit 1 and the reader transmitter circuit 2. Envelope detector 41 and analogue digital converter 42 are regrouped. Both the linear feedback shift register 43 and the cross-correlation device 44 are detailed. The processing of the different signals, which are the maximal length sequence MLS, the digitized signal x(k), the generated digitized signal y(k) and the searched for digitized impulse response h(k), is shown in more detail than on FIG. 5.

The linear feedback shift register 43 comprises several delay lines 431 connected to one another in series, and an adder 432. The output of the adder 432 is connected to the input of the first delay line 431. One input of the adder 432 is connected to the output of the last delay line 431. The other input of the adder 432 is connected to an intermediate position in the series of delay lines 431.

The cross-correlation device 44 comprises several simplified correlation cells 441 connected to one another in series. Each simplified correlation cell comprises two inputs and one output. At the first input of each simplified correlation cell, there is a different sample of the digitized signal x(k) which is the maximal length sequence MLS. At the second input of each simplified correlation cell 441, there is a different sample of the digitized signal y(k) which is generated at the output of the analog digital converter 42. At the output of each simplified correlation cell, there is a different sample of the digitized signal h(k) which is the digitized impulse response.

Figure 7:
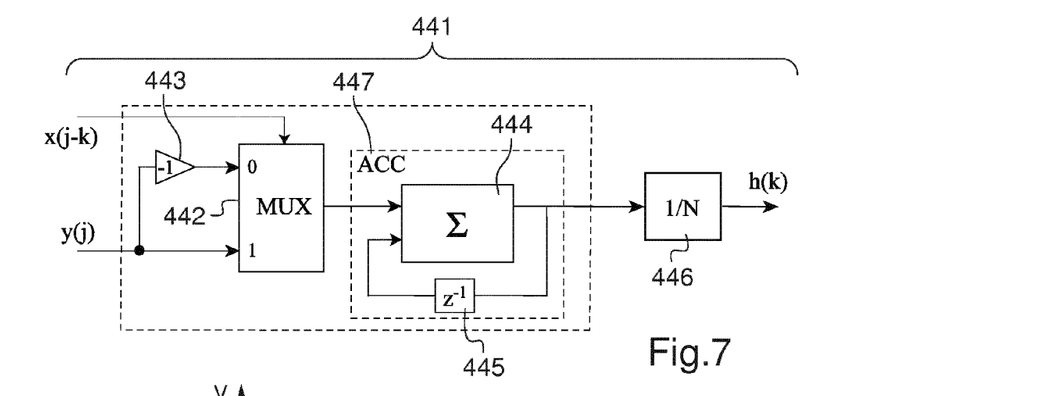
FIG. 7 shows an example of a more detailed part of circuits of a tag reader as shown in FIG. 6.

FIG. 7 shows an example of a more detailed part of circuits of a tag reader as shown in FIG. 6. Each simplified correlation cell 441 comprises a multiplexer 442, an inverter 443, an accumulator 447 comprising an adder 444 and a delay line 445, a divider 446. At the output of this simplified correlation cell 441, there is one sample h(k) of the digitized impulse response. At the first input of this simplified correlation cell 441, there is one sample x(j-k) of the maximal length sequence. At the second input of this simplified correlation cell 441, there is one sample y(j) of the signal generated at the output of the analogue digital converter 42.

The second input of this simplified correlation cell 441 is simultaneously directly connected to one input of the multiplexer 442 and indirectly connected to another input of the multiplexer 442 via the inverter 443. The first input of this simplified correlation cell 441 is directly connected to the control input of the multiplexer 442. The output of the multiplexer 442 is directly connected to one input of the adder 444. The output of the adder 444 is on the one side connected to the input of the divider 446 and on the other side feedbacks another input of the adder 444 via a delay line 445. The output of the divider 446 is the output of the simplified correlation cell 441.

Performing the cross-correlation of x(k) and of y(k) is indeed relatively simple because the products are replaced by sums since x(k) is a maximal length sequence. Each simplified correlation cell 441 is used to obtain one of the components of the impulse response h(k). Each sample of the output sequence y(j) is multiplied by 1 or −1, which are the maximal length sequence analog levels at the output of the digital analogue converter 11 shown in FIG. 5, in the multiplexer 442 controlled by the input sequence x(j−k), and the result is added to the sum stored in the adder 444 of the accumulator 447. The value obtained at the end of the calculation loop realized by the delay line 445 is divided by L+1 in the divider 446. In the end, the equation of cross-correlation, between x(k) and y(k), results in:

$$\phi_{xy}(k) = \frac{1}{L+1} \sum_{j=0}^{L-1} x(j-k) y(j) \qquad \text{Equation 2}$$

The first m components of the impulse response which are h(k), with k varying from 0 to m−1, can be obtained with the help of the circuit shown in FIG. 6, each of these m components corresponding to the output of a simplified correlation cell 441 as the one shown in FIG. 7. The on-chip implementation shown on circuits of FIGS. 6 and 7 does not give the overall impulse response but only the first m samples of h(k), at the sampling frequency of the injected digitized signal x(k). These first m samples of h(k) are called the h(k) pattern. This measured h(k) pattern is then compared to the nominal patterns, what will be explained in more detail with respect to FIG. 8. If samples beyond the above set would be required, longer linear feedback shift registers could be used, but this would result in increasing the time needed for performance of this advanced Low Power Tag Detection method.

As a preferred numerical example to implement an important capability to detect a nearby tag while using this advanced Low Power Tag Detection method, the parameters have been chosen as follows. We have m=16 which makes $L=2^{16}-1=65535$. The digitization frequency of the maximal length sequence is $F_c=1$ MHz, which makes the duration of the maximum length sequence MLS to be $T_{MLS}=65535/1$ M=65.5 ms. This duration of 65.5 ms presents the advantage of being less than 100 ms which would correspond to emission duration of about 10% of the overall time which is still a low proportion of overall time corresponding to power emission time, what is one key advantage of this advanced Low Power Tag Detection method. Choosing m>16 would result in a duration emission longer than 10% of the overall time, what would make this advanced Low Power Tag Detection method more power consumptive and therefore somewhat less interesting. On the contrary, choosing m<13 would result in a shorter sequence of impulse response samples, in an impulse response with less content of information, what would make this advanced Low Power Tag Detection method less precise and therefore somewhat less interesting. The digitization frequency $F_c$ of the maximal length sequence is will preferably be kept equal to or lower than 1.5 MHz, since above 2 MHz, it becomes less easy to extract the impulse response.

Figure 8:
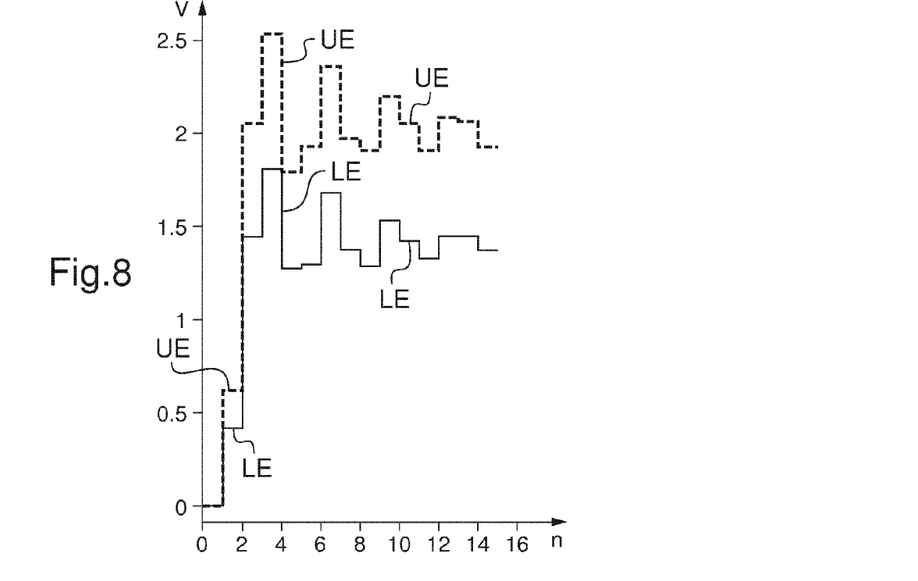
FIG. 8 shows an example of a predetermined envelope which can be used in an assessing step of a method of detection of a tag presence by a tag reader according to an embodiment of the invention.

FIG. 8 shows an example of a predetermined envelope which can be used in an assessing step of a method of detection of a tag presence by a tag reader according to an embodiment of the invention. A value V, which is unit-less, of the impulse response, is plotted as a function of n, the number of measured samples of the impulse response. There can be seen a minimum curve, the lower limit of the envelope LE, and a maximum curve, the upper limit of the envelope UE. This minimum curve, the lower limit of the envelope LE, and this maximum curve, the upper limit of the envelope UE, delimit an envelope, also called interval, which is situated between the curves UE and LE, and in which the measured impulse response is supposed to be in case of a nearby tag. Indeed, once the h(k) pattern has been measured, the h(k) pattern is compared to these lower limit of the envelope LE and upper limit of the envelope UE. If the measured h(k) pattern is totally found to be within the interval located between this lower limit of the envelope LE and this upper limit of the envelope UE, this implies that there is at least a nearby tag present in the vicinity of the reader which then can detect it, this nearby tag impacting the loading across the reader antenna, and thus changing the form of the impulse response h(k). If at least one sample of the measured h(k) pattern is found to be out of this interval, this implies that there is no nearby tag in the vicinity of the reader. Typically, presence of a lossy or metallic object, of simply absence of tag and of any other object, would lead to an impulse response being, at least partly, outside this interval.

One way to determinate these lower limit of the envelope LE and upper limit of the envelope UE can be the following one, using the same maximum length sequence parameters as the ones depicted in the preferred numerical example related to FIGS. 6 and 7. First, one-time parametric transient simulations were performed by sweeping four variables. First variable is the coupling factor k, within the operating volume of Near Field Communication. Second variable is the tag resonance frequency, going from 13.56 MHz to 23 MHz. Third variable is the tag quality factor Q, going from Q=15 to Q=24. Fourth variable is the tag load, going from 50 to 5000 ohms. Those simulations were performed at many, here preferably at all, Near Field Communication standards, data rates, type A, Type B and Type F protocols, and in many, here preferably at all available power modes.

As a result of the parametric simulation, it was possible to have the $h_i(k)$ patterns that correspond to each simulation, with i being the simulation number. The lower limit of the envelope LE and the upper limit of the envelope UE were then chosen such that for all $h_i(k)$, none of $h_i(k)$ samples is outside the envelope interval limited by LE and UE and encompassing all measured impulse responses. Preferably, the lower limit of the envelope LE and the upper limit of the envelope UE were also chosen such that the interval is made as small as possible. Once this interval is obtained, it is saved in a register on-chip of the reader. When in the field, at each time the reader starts performance of the advanced Low Power Tag Detection method, the first 16 samples of the sampled impulse response h(k), also called h(k) pattern, are measured using the technique previously described. In the digital part of the reader circuit, the h(k) measured pattern is compared to the [LE, UE] interval. As already mentioned, if at least one sample of the h(k) measured pattern is out of this interval, there is no nearby tag, whereas there is a nearby tag if all samples of the h(k) measured pattern are within this interval.

Figure 9:
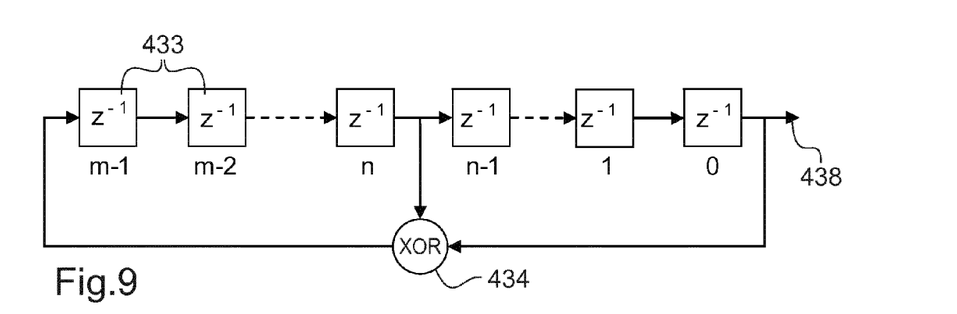
FIG. 9 shows an example of a linear feedback shift register which can be used in a tag reader according to an embodiment of the invention.

FIG. 9 shows an example of a linear feedback shift register which can be used in a tag reader according to an embodiment of the invention. The maximum length sequences, which are also called pseudo-random sequences, or pseudo-noise sequences or m-sequences, are certain binary sequences of length $L=2^m-1$ with m denoting the order of the sequence. These sequences are already known in areas such as range-finding, scrambling, fault detection, modulation, synchronization and acoustic measurements. To construct a maximum length sequence MLS of a given length L, a primitive polynomial p(x) of a degree m is used. An example of such a polynomial is given by the following expression:

$$p(x)=x^m+x^n+1, 0<n<m.$$

This polynomial specifies a linear feedback shift register as shown in FIG. 9, comprising unit-sample delays 433, also called delay lines 433, produced by memory elements, as well as a XOR device 434. The linear feedback shift register presents an output 438 at the level of the output of the last delay line 435. The linear feedback shift register is clocked at a certain fixed frequency $F_c$. The values of n and m are chosen so that the linear feedback shift register generates a maximal length sequence and then this obtained linear feedback shift register can be used in the circuit of FIG. 6.

Figure 10:
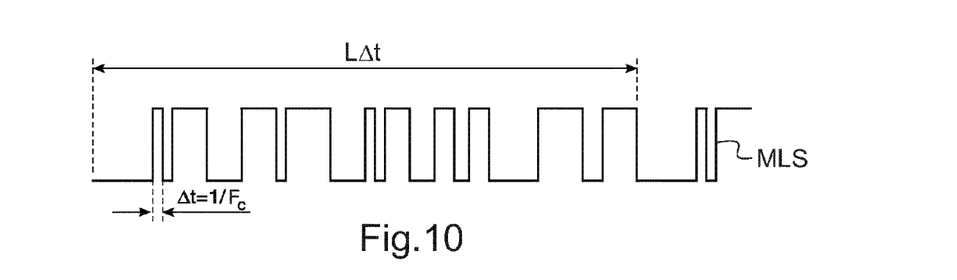
FIG. 10 shows an example of a maximum length sequence which can be produced by a linear feedback shift register as shown in FIG. 9.

FIG. 10 shows an example of a maximum length sequence which can be produced by a linear feedback shift register as shown in FIG. 9. This maximum length sequence MLS has a duration of $L*\Delta t$, with $\Delta t$ the period equal to $1/F_c$.

Figure 11:
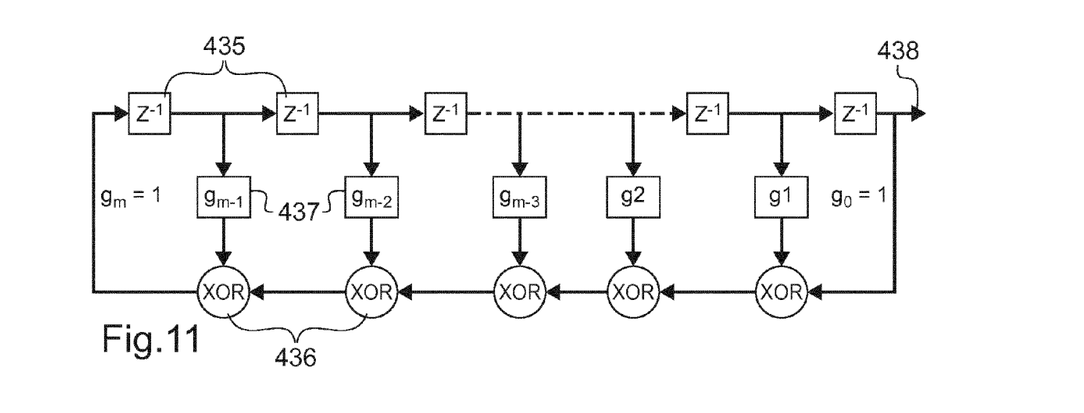
FIG. 11 shows an example of a first type of linear feedback shift register which can be used in a tag reader according to an embodiment of the invention.

FIG. 11 shows an example of a first type of linear feedback shift register which can be used in a tag reader according to an embodiment of the invention. This first type of linear feedback shift register comprises delay lines 435, XOR devices 436 and weightings 437. The linear feedback shift register presents an output 438 at the level of the output of the last delay line 435. Delays lines 435 are connected in series to one another. XOR devices 436 are connected in series to one another. Output of last delay line 435 is connected to one of the input of first XOR device 436, whereas input of first delay line 435 is connected to output of last XOR device 436. Weightings 437 are connected in parallel, each time between the output of a delay line 435 and the other input, the free input, of a corresponding XOR device 436. The first type of linear feedback shift register corresponds to a Fibonacci implementation consisting of a simple shift register in which a binary-weighted modulo-2 sum of the taps is fed back to the input. For the generation of binary sequences, the coefficients $\{g_0, g_1, \ldots, g_m\}$ belong to $\{0, 1\}$.

Figure 12:
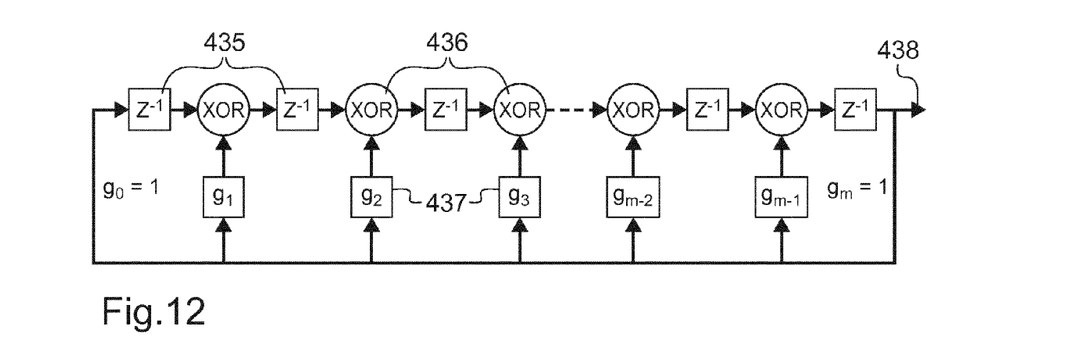
FIG. 12 shows an example of a second type of linear feedback shift register which can be used in a tag reader according to an embodiment of the invention.

FIG. 12 shows an example of a second type of linear feedback shift register which can be used in a tag reader according to an embodiment of the invention. This second type of linear feedback shift register comprises delay lines 435, XOR devices 436 and weightings 437. The linear feedback shift register presents an output 438 at the level of the output of the last delay line 435. Couples consisting of a delay line 435 and of a XOR device 436 are connected in series to one another. Output of last delay line 435 is connected to input of first delay line 435. Weightings 437 are connected in parallel, each time between the output 438 of the linear feedback shift register and the other input, the free input, of a corresponding XOR device 436. The second type of linear feedback shift register corresponds to a Galois implementation consisting of a shift register, the contents of which are modified at every step by a binary-weighted value of the output stage. For the generation of binary sequences, the coefficients $\{g_0, g_1, \ldots, g_m\}$ belong to $\{0, 1\}$. It can be seen that the order of the Galois weightings 437 is opposite to that of the Fibonacci weightings 437.

Whatever the linear feedback shift register used to generate the desired maximum length sequence MLS, this maximum length sequence MLS will present the following property, which is used to obtain equation 1, and which is: if an m-sequence is mapped to an analog time-varying waveform, by mapping each binary zero to −1 and each binary one to +1, then the autocorrelation function will have a periodic triangular shape, with period equal to $T_c$ and with unity for zero delay and $1/L=-1/(2^m-1)$ for any delay greater that one bit. It can be noticed that, for a long maximum length sequence MLS at small period $T_c$, the autocorrelation is almost an impulse function of period equal to $LT_c$. This property is used to obtain equation 1 (see before), since it proves that the impulse response equals the input/output cross-correlation when the stimulating signal is a maximum length sequence.

A maximum length sequence also presents other properties, among which there are:
- the modulo-2 sum of a maximum length sequence MLS and another phase of the same sequence yield a third phase of the sequence.
- a maximum length sequence MLS is deterministic and periodic of period $L=2^m-1$, where m is the length of the linear feedback shift register.
- an m-sequence contains exactly $2^{m-1}$ ones and $2^{m-1}-1$ zeros.
- each node of an m-sequence generator runs through a certain phase of the sequence. This is always true with a Fibonacci linear feedback shift register, this is not always true with a Galois linear feedback shift register.
- a sliding window of length m, passed along an m-sequence for $2^m-1$ positions, will span every possible m-bit number, except all zeros, once and only once.
- if it is defined a series of length r to be a sequence of r consecutive identical numbers, then, in any maximum length sequence MLS, there are: one series of 1s of length m, one series of 0s of length m−1, one series of 1s and one series of zeros each of length m−2, two series of 1s and two series of 0s each of length m−3, four series of ones and four series of zeros each of length m−4, and so on to $2^{m-3}$ series of 1s and $2^{m-3}$ series of 0s each of length 1.
- the power spectrum of a maximum length sequence MLS is a discrete spectrum whose upper 3 dB roll-off frequency is about $0.45\ F_c$. By adjusting the clock frequency, a broadband signal over a wide frequency range can be generated.
- if the order of the feedback taps is reversed, the resulting sequence will be the time reversal of the original sequence, and will also be an m-sequence.
- the tap numbers of any given m-sequence linear feedback shift register will all be relatively prime.

The invention has been described with reference to preferred embodiments. However, many variations are possible within the scope of the invention.

The invention claimed is:

1. A Near Field Communication method for detecting whether a tag is present by a tag reader, the method comprising:
   stimulating an input of a transmitter of the tag reader with an input signal corresponding to an input sequence to generate an output signal of the transmitter, wherein the output signal represents the input signal convoluted by an impulse response of said transmitter under a current load condition of the transmitter;
   detecting the impulse response of said transmitter;
   evaluating the impulse response generated by said transmitter by comparing the impulse response to a time-varying lower limit and a time-varying upper limit of a predetermined envelope wherein the predetermined envelope is based on the input sequence; and
   assessing whether a tag is present based on said comparison of the impulse response to the time-varying lower limit and the time-varying upper limit of the predetermined envelope.

2. The Near Field Communication method according to claim 1, wherein said assessing comprises:
   deducing that a tag is present if said impulse response of said transmitter is completely within the time-varying upper and lower limits of said predetermined envelope, or that said tag is absent, if said impulse response is at least partly outside of the time-varying upper and lower limits of said predetermined envelope.

3. The Near Field Communication method according to claim 2, wherein:
   the time-varying upper and lower limits of the predetermined envelope are such that any impulse response due to any tag of a predetermined set of tags able to communicate with said tag reader is simultaneously above said time-varying lower limit of the predetermined envelope and below said time varying upper limit of the predetermined envelope.

4. The Near Field Communication method according to claim 2, wherein:
   said evaluated impulse response is digital, and
   said deducing asserts that the tag is absent if at least one sample of said digital evaluated impulse response is outside either of the upper or lower limits of said predetermined envelope.

5. The Near Field Communication method according to claim 1, wherein said evaluating comprises:
   digitally evaluating said impulse response.

6. The Near Field Communication method according to claim 1, wherein said evaluating comprises:
   cross-correlating the output signal at an output of said transmitter with a second signal which has been sent to the input of said transmitter to generate said impulse response.

7. The Near Field Communication method according to claim 1, wherein said stimulating comprises:
   sending, to the input of said transmitter, a signal representative of a pseudo random binary sequence.

8. The Near Field Communication method according to claim 7, wherein:
   said pseudo-random binary sequence is a maximal length sequence generated by a linear feedback shift register.

9. The Near Field Communication method according to claim 8, wherein:
   parameters of said maximal length sequence are chosen such that said tag reader emits a periodic polling signal for tag detection, which emission lasts between 1% and 10% of a total polling time.

10. The Near Field Communication method according to claim 9, wherein:
    said emission duration lasts between 5% and 10% of a total polling time.

11. The Near Field Communication method according to claim 1, wherein:
    the transmitter of the tag reader is stimulated using an input signal corresponding to a sequence of values;

the time-varying upper limit and time-varying lower limit of the predetermined envelope depend upon the sequence of values; and said assessing comprises one of:

deducing that a tag is present if the impulse response of the transmitter is within the time-varying upper and lower limits of the predetermined envelope, or deducing that a tag is absent, if the impulse response is at least partly outside of the time-varying upper and lower limits of the predetermined envelope.

12. The Near Field Communication method according to claim 1, wherein said stimulating comprises:

sending, to the input of said transmitter, a stimulating signal having an autocorrelation characteristic so that a convolution of the output signal delivered at an output of said transmitter with said stimulating signal gives substantially said impulse response.

13. The Near Field Communication method according to claim 1, wherein said stimulating, said evaluating and said assessing are all performed on a chip of said tag reader.

14. The Near Field Communication method according to claim 1, wherein the impulse response includes a number of samples X and the evaluation of the impulse response is based on, starting from a beginning of the impulse response, a first number of samples m and not samples following the first number of samples m, wherein m is less than X.

15. The Near Field Communication method according to claim 1, wherein it is assessed that the tag is absent if at least one sample of said digital evaluated impulse response exceeds the upper limit of said predetermined envelope.

16. A non-transitory computer readable medium storing thereon a computer program comprising program instructions, which when loaded into a data-processing unit cause the data processing unit to:

stimulate an input of a transmitter of the tag reader with an input signal corresponding to an input sequence to generate an output signal of the transmitter, wherein the output signal represents the input signal convoluted by an impulse response of said transmitter under a current load condition of the transmitter;

evaluate the impulse response generated by said transmitter by comparing the impulse response to a time-varying lower limit and a time-varying upper limit of a predetermined envelope wherein the predetermined envelope is based on the predetermined input sequence; and assess whether a tag is present based on said comparison of the impulse response to the time-varying lower limit and the time-varying upper limit of the predetermined envelope.

17. The non-transitory computer readable medium according to claim 16, wherein the impulse response includes a number of samples X and the evaluation of the impulse response is based on, starting from a beginning of the impulse response, a first number of samples m and not samples following the first number of samples m, wherein m is less than X.

18. The non-transitory computer readable medium according to claim 16, wherein it is assessed that the tag is absent if at least one sample of said digital evaluated impulse response exceeds the upper limit of said predetermined envelope.

19. A Near Field Communication tag reader, comprising:

a transmitter;

an emitter configured to send a stimulating signal to an input of the transmitter so as to generate an output signal at an output of the transmitter, wherein the output signal corresponds to the stimulating signal convoluted by an impulse response of said transmitter under a current load condition of the transmitter;

an evaluator configured to evaluate the impulse response by comparing the impulse response to a time-varying lower limit and a time-varying upper limit of a predetermined envelope wherein the predetermined envelope is based on the stimulating signal;

an assessor configured to assess whether a tag is present based on said comparison of the impulse response to the time-varying lower limit and the time-varying upper limit of the predetermined envelope.

20. The Near Field Communication tag reader according to claim 19, wherein:

the stimulating signal corresponds to a sequence of values;

the time-varying upper limit and time-varying lower limit of the predetermined envelope depend upon the sequence of values; and the assessor is configured to deduce one of:

that a tag is present if the evaluated impulse response of the transmitter is within the time-varying upper and lower limits of the predetermined envelope, or that a tag is absent, if the evaluated impulse response is at least partly outside of the time-varying upper and lower limits of the predetermined envelope.

21. The Near Field Communication tag reader according to claim 19, wherein the impulse response includes a number of samples X and the evaluation of the impulse response is based on, starting from a beginning of the impulse response, a first number of samples m and not samples following the first number of samples m, wherein m is less than X.

22. The Near Field Communication tag reader according to claim 19, wherein it is assessed that the tag is absent if at least one sample of said digital evaluated impulse response exceeds the upper limit of said predetermined envelope.

\* \* \* \* \*